United States Patent
Yeo et al.

(10) Patent No.: US 9,164,320 B2
(45) Date of Patent: Oct. 20, 2015

(54) LIGHT EMITTING UNIT WITH HIGH LIGHT SPREADING ANGLE, BACKLIGHT ASSEMBLY HAVING THE SAME, AND DISPLAY APPARATUS

(71) Applicant: SAMSUNG DISPLAY CO., LTD., Yongin, Gyeonggi-Do (KR)

(72) Inventors: Dongmin Yeo, Asan-Si (KR); Sangheon Ye, Cheonan-Si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 14/011,271

(22) Filed: Aug. 27, 2013

(65) Prior Publication Data

US 2014/0268653 A1    Sep. 18, 2014

(30) Foreign Application Priority Data

Mar. 15, 2013    (KR) .......................... 10-2013-0027935

(51) Int. Cl.
*F21V 7/04* (2006.01)
*G02F 1/1335* (2006.01)

(52) U.S. Cl.
CPC .... *G02F 1/133611* (2013.01); *G02F 1/133603* (2013.01)

(58) Field of Classification Search
CPC .................. G02F 1/133611; G02F 1/133601; G02F 1/133604; G02F 1/133605; G02F 1/133607; G02F 1/133608

USPC ................. 362/327, 608, 609, 611, 612, 800; 313/498–511; 257/98, 95, 100, 687, 257/730.787

See application file for complete search history.

(56) References Cited

U.S. PATENT DOCUMENTS

| 7,445,359 B2 * | 11/2008 | Chang .......................... 362/331 |
| 7,473,937 B2 | 1/2009 | Park et al. |
| 2005/0001537 A1 | 1/2005 | West et al. |

(Continued)

FOREIGN PATENT DOCUMENTS

| JP | 2011-249141 | 12/2011 |
| KR | 10-0691954 | 2/2007 |
| KR | 10-2008-0108759 | 12/2008 |
| KR | 10-1076738 | 7/2010 |

OTHER PUBLICATIONS

English Abstract for Publication No. 10-0691954.

(Continued)

*Primary Examiner* — Tracie Y Green
(74) *Attorney, Agent, or Firm* — F. Chau & Associates, LLC

(57) ABSTRACT

A backlight assembly includes a light emitting unit, a reflective sheet, and a bottom cover. The light-emitting unit includes a light source emitting light and an optical system. The optical system is spaced apart from the light source in a direction in which the light emitted from the light emitting unit initially travels. The optical system has a curved shape that reflects a portion of the light emitted from the light source and transmits a remaining portion of the light emitted from the light source. The reflective sheet is disposed under the light-emitting unit to re-reflect the light reflected by the optical system. The bottom cover accommodates the light emitting unit and the reflective sheet. Thus, the light-spreading angle of the light-emitting unit becomes wide.

21 Claims, 5 Drawing Sheets

(56) References Cited

U.S. PATENT DOCUMENTS

| | | |
|---|---|---|
| 2009/0032827 A1 | 2/2009 | Smits |
| 2011/0280023 A1* | 11/2011 | Lee et al. ............... 362/338 |
| 2012/0134136 A1* | 5/2012 | Seo et al. ............... 362/97.1 |
| 2014/0204276 A1* | 7/2014 | Kuromizu, Yasumori .... 348/725 |

OTHER PUBLICATIONS

English Abstract for Publication No. 10-2008-0108759.
English Abstract for Publication No. 10-1076738.
English Abstract for Publication No. 2011-249141.

* cited by examiner

LIGHT EMITTING UNIT WITH HIGH LIGHT SPREADING ANGLE, BACKLIGHT ASSEMBLY HAVING THE SAME, AND DISPLAY APPARATUS

CROSS-REFERENCE TO RELATED APPLICATION

This U.S. non-provisional patent application claims priority under 35 U.S.C. §119 to Korean Patent Application No. 10-2013-0027935, filed on Mar. 15, 2013, the contents of which are hereby incorporated by reference in its entirety.

TECHNICAL FIELD

The present disclosure relates to a light emitting unit, and more particularly, to a light-emitting unit with a high light spreading angle, a backlight assembly having the same, and a display apparatus having the same.

DISCUSSION OF THE RELATED ART

A non-self emissive display apparatus, such as a liquid crystal display apparatus, an electrophoretic display apparatus, an electrowetting display apparatus, etc., utilizes a separate backlight assembly to generate light for viewing images displayed on the display apparatus.

The backlight assembly may either be an edge-illumination type backlight assembly in which a display panel is illuminated from a side edge thereof or a direct-illumination type backlight assembly in which the display panel is illuminated from behind.

The direct-illumination type backlight assembly does not require a light guide plate and a heat-discharge part, which are used in the edge-illumination type backlight assembly, and thus a manufacturing cost of the direct-illumination type backlight assembly is relatively low. In addition, light loss in the direct-illumination type backlight assembly may be less than that of the edge-illumination type backlight assembly, so that the direct-illumination type backlight assembly may provide a greater level of brightness than that of the edge-illumination type backlight assembly for a given backlight power level.

SUMMARY

The present disclosure provides a light-emitting unit capable of increasing a light spreading angle and having a reduced manufacturing cost.

The present disclosure provides a backlight assembly having the light-emitting unit.

The present disclosure provides a display apparatus having the backlight assembly.

Embodiments of the inventive concept provide a light-emitting unit including a light source that emits light and an optical system. The optical system is disposed spaced apart from the light source in a direction in which light emitted from the light source travels and the optical system has a curved shape reflecting a portion of the light emitted from the light source and transmitting a remaining portion of the light emitted from the light source.

The optical system has a concave shape with respect to the direction in which the light travels from the light source. The light emitting unit has a light spreading angle equal to or greater than about 150 degrees and less than or equal to about 180 degrees. A light spreading angle and a front light exit rate of the light-emitting unit are independently controlled.

Embodiments of the inventive concept provide a backlight assembly including a light emitting unit, a reflective sheet, and a bottom cover. The light-emitting unit includes a light source emitting light and an optical system.

The optical system is disposed spaced apart from the light source in a direction in which light travels from the light source and the optical system has a curved shape reflecting a portion of the light emitted from the light source and transmitting a remaining portion of the light emitted from the light source. The reflective sheet is disposed under the light-emitting unit re-reflecting the light reflected by the optical system. The bottom cover accommodates the light emitting unit and the reflective sheet.

The reflective sheet includes a curved portion covering the light-emitting unit when viewed in a plan view, and the curved portion has a convex shape with respect to the direction in which light travels from the light source.

The bottom cover includes a bottom portion and a sidewall vertically extended from the bottom portion. The bottom portion has a convex shape with respect to the direction in which light travels from the light source and the bottom portion includes a protruding portion supporting the curved portion.

Embodiments of the inventive concept provide a display apparatus including a display panel that displays an image and a backlight assembly that provides light to the display panel. The backlight assembly includes the above-mentioned light emitting unit, the reflective sheet, and the bottom cover.

According to the above, since the light spreading angle of the light emitting unit becomes wider, the number of light emitting units required is reduced, thereby reducing a manufacturing cost of the light emitting unit and the backlight assembly.

In addition, the light spreading angle and the front light exit rate of the light-emitting unit may be controlled independently from each other.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout the specification. As used herein, the term "and/or" includes any and all combinations of one or more of the associated listed items.

Hereinafter, exemplary embodiments of the present invention will be explained in detail with reference to the accompanying drawings.

Figure 1:
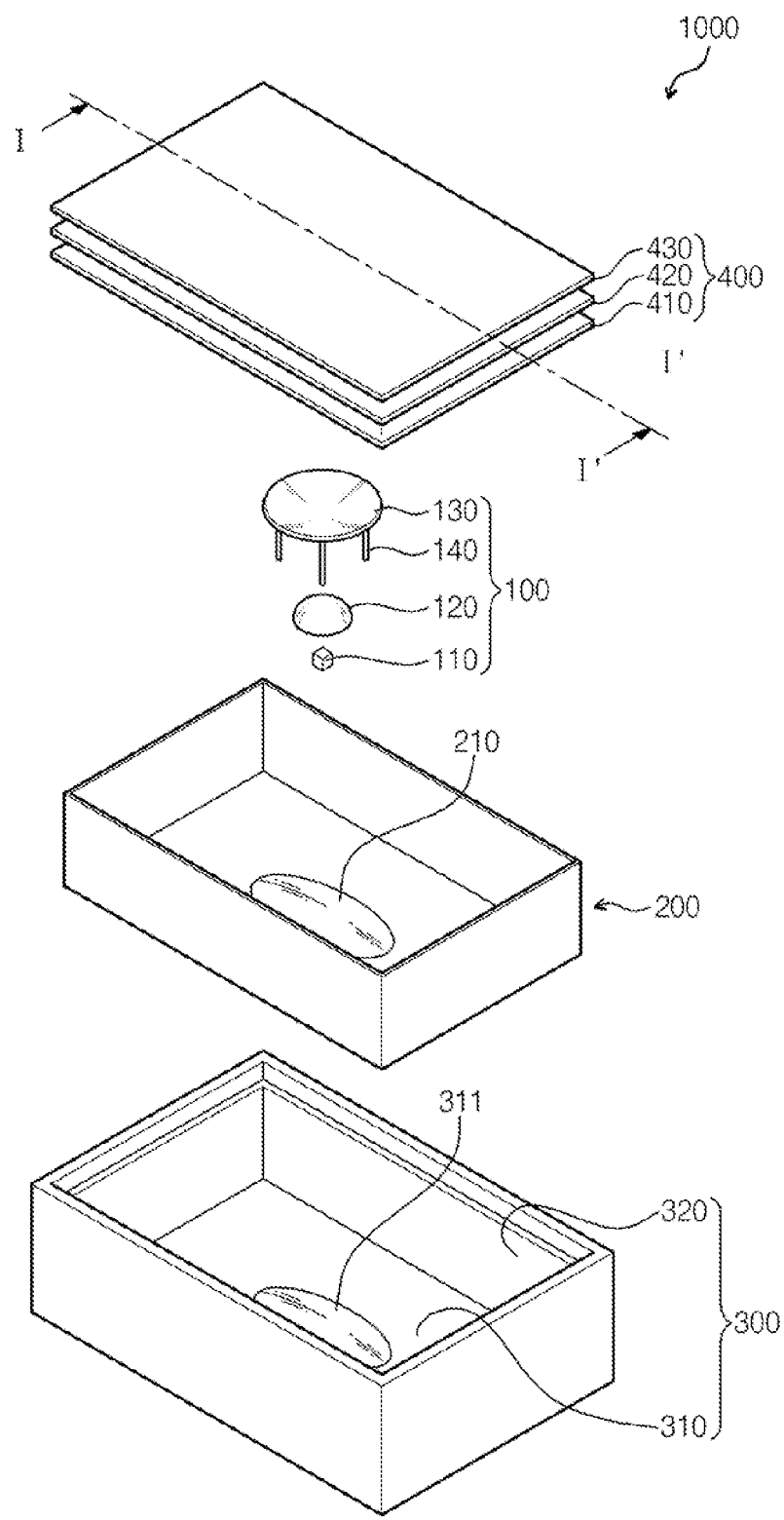
FIG. 1 is an exploded perspective view showing a backlight assembly according to an exemplary embodiment of the present disclosure.
Figure 2:
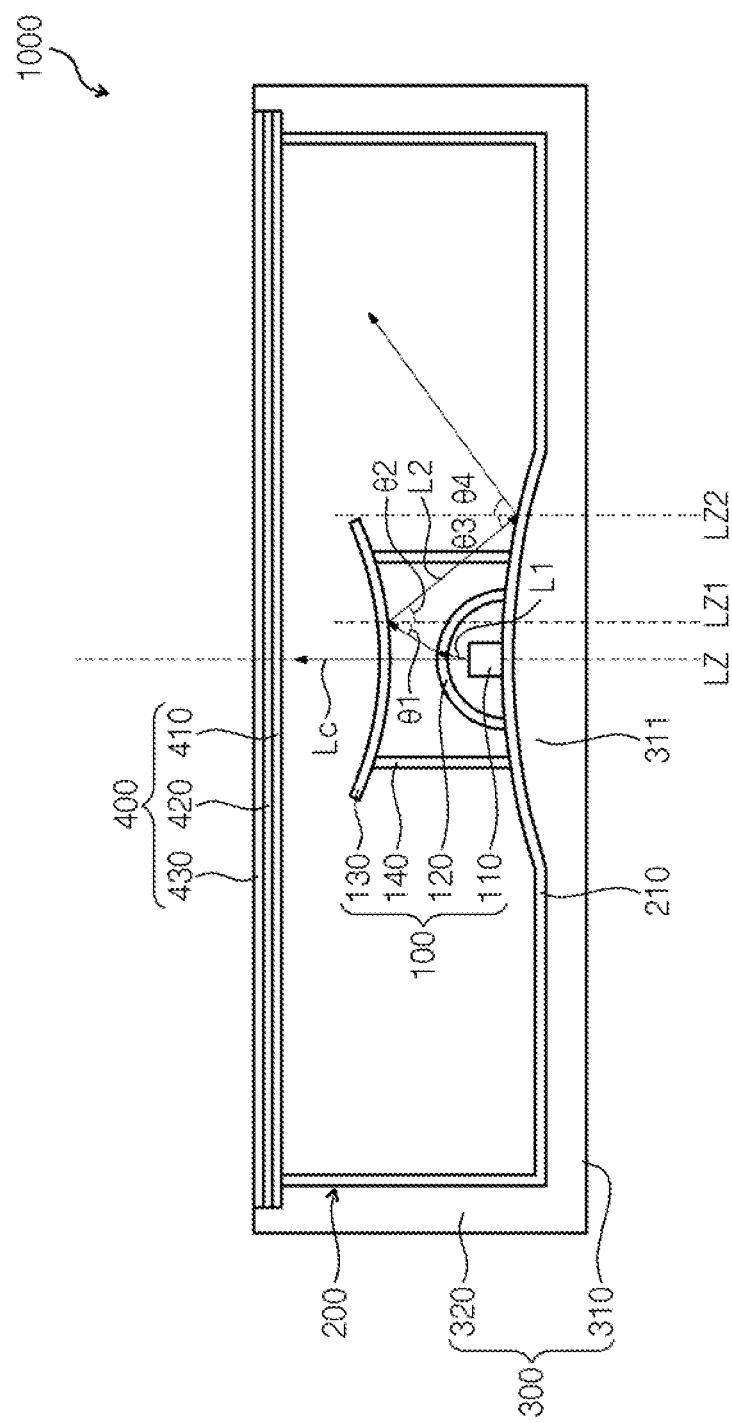
FIG. 2 is a cross-sectional view taken along a line I-I' of FIG. 1.

FIG. 1 is an exploded perspective view showing a backlight assembly 1000 according to an exemplary embodiment of the present disclosure and FIG. 2 is a cross-sectional view taken along a line I-I' of FIG. 1.

Referring to FIGS. 1 and 2, the backlight assembly 1000 includes a light emitting unit 100, a reflective sheet 200, a bottom cover 300, and an optical sheet 400.

The light-emitting unit 100 includes a light source 110 emitting light, an optical lens 120, and an optical system 130.

The light source 110 emits light in response to a driving voltage applied from an external source (not shown). The light source 110 may be, but not limited to, a light emitting diode. The light-emitting unit 100 includes at least one light source 110. Only one light source 110 has been shown in FIGS. 1 and 2 for the purpose of providing a simple view. The light source 110 emits light at a predetermined angle with respect to a light axis LX vertical to the light source 110.

The optical lens 120 is disposed between the light source 110 and the optical system 130. Light emitted from the light source 110 is incident into the optical lens 120. The optical lens 120 has a shape symmetrical with respect to the light axis LZ as shown in FIGS. 1 and 2, has a uniform thickness, and has a hemispherical shape in which upper and lower surfaces have different radii of curvatures from each other. However, the configuration of the light-emitting unit 100 is not limited to the example shown.

The optical lens 120 widens a spreading angle of the light emitted from the light source 110. For example, the optical lens 120 may serve to spread light emerging therefrom over a larger angle. The optical lens 120 refracts a portion of the light emitted from the light source 110. The refracted light travels at an angle that is substantially different than that of the light axis LZ. Among the light emitted from the light source 110, light L1 traveling in a direction different from the light axis LZ is refracted while passing through the optical lens 120. In this case, among the light emitted from the light source, light Lc traveling in a direction matched with the light axis LZ continues to travel in the direction of the light axis LZ without being refracted by the optical lens 120. The optical lens 120 may be formed of a transparent material having a refractive index equal to or greater than 1.

The optical lens 120 is disposed on the same layer as the light source 110, but the optical lens 120 is disposed spaced apart from a layer (e.g., the reflective sheet 200 in FIGS. 1 and 2) on which the light source 110 is disposed in the direction of the light axis LZ. In this case, a lens supporter (not shown) may be disposed between the optical lens 120 and the reflective sheet 200 to support the optical lens 120.

The optical system 130 is disposed on and spaced apart from the light source 110 and the optical lens 120. The optical system 130 reflects a portion of the light incident thereto and transmits a remaining portion of the light incident thereto. The optical system 130 may be formed of a semi-transparent material. Light L2 reflected by the optical system 130 travels downward from the optical system 130 and is reflected by the reflective sheet 200 for a second time. The light transmitting through the optical system 130 travels in the direction in which the light exiting from the light source 110 travels.

The optical system 130 may have a curved shape and a uniform thickness. An upper surface of the optical system 130 corresponds to a portion of a surface of a sphere with a first radius of curvature and a lower surface of the optical system 130 corresponds to a portion of a surface of a sphere with a second radius of curvature different from the first radius of curvature. The optical system 130 has a concave shape with respect to the path in which the light emitted from the light source 110 travels. Accordingly, when assuming that a first reference line LZ1 substantially parallel to the light axis LZ is a reference axis, a refection angle $\theta 2$ of the light incident to the optical system 130 with respect to the first reference line LZ1 is greater than an incident angle $\theta 1$ of the light incident to the optical system 130 with respect to the first reference line LZ1.

The portion of the light emitted from the light source 110 transmits through the optical system 130 and travels upward from the optical system 130, and the remaining portion of the light emitted from the light source 110 travels downward from the optical system 130 after being reflected by the optical system 130.

The light-spreading angle of the light emitted from the light source 110 is widened by the optical system 130 and the reflective sheet 200.

The light-emitting unit 100 further includes an optical system supporter 140. The optical system supporter 140 is disposed between the reflective sheet 200 and the optical system 130. There may be a plurality of optical system supporters used. The optical system supporter 140 supports the optical system 130 and separates the optical system 130 from the light source 110 and the optical lens 120. FIGS. 1 and 2 show four optical system supporters 140 each having a column shape, but the number and shape of the optical system supporter 140 is not limited to the configuration shown and described herein. Meanwhile, the optical system supporter 140 and the optical system 130 may be integrally formed with each other.

The reflective sheet 200 is disposed on an inner surface of the bottom cover 300 and is located at a lower portion of the light source 110. The reflective sheet 200 reflects most of the light incident thereto. In particular, the reflective sheet 200 reflects light reflected by the optical system 130 to allow the light to travel upwardly.

The reflective sheet 200 includes a curved portion 210 covering the light-emitting unit 100 when viewed in a plan view. The light emitting unit 100 is disposed overlapping with the curved portion 210. For example, the curved portion 210 has an area greater than that of the optical system 130 when viewed in a plan view.

The curved portion 210 has a convex shape with respect to the direction in which the light emitted from the light source 110 travels. The light L2 reflected by the optical system 130 is re-reflected by the curved portion 210. When assuming that a second reference line LZ2 substantially in parallel with the light axis LZ is a reference axis, a refection angle $\theta 4$ of the light L2 reflected by the optical system 130 with respect to the second reference line LZ2 is greater than an incident angle $\theta 3$ of the light L2 reflected by the optical system 130 with respect to the second reference line LZ2.

The light-spreading angle of the light emitted from the light source 110 is widened by the curved portion 210.

The reflective sheet 200 may include a film formed by adding a white pigment to a resin, e.g., polyester, or a film in which bubbles are distributed. However, the reflective sheets may have other arrangements.

The bottom cover 300 has a receiving space therein and the light emitting unit 100 and the reflective sheet 200 are configured to be accommodated in the receiving space.

The bottom cover 300 includes a bottom portion 310 and a sidewall 320 extended vertically from an edge of the bottom portion 310. In FIGS. 1 and 2, inner and outer surfaces of the sidewall 320 are vertically extended with respect to the bottom portion 310. However, other configurations of the bottom cover may be used. For example, the inner surface of the sidewall 320 may be inclined with respect to the bottom portion 310.

The bottom portion 310 includes a protruding portion 311 having a shape corresponding to the curved portion 210.

The protruding portion 311 has an area equal to that of the curved portion 210 when viewed in a plan view. In addition, the protruding portion 311 has a convex shape with respect to the direction in which light emitted from the light source 110 travels. The protruding portion 311 supports the convex portion of the curved portion 210.

The sidewall 320 includes a step portion formed at an upper end portion thereof, and the optical sheet 400 is disposed on the step portion of the sidewall 320.

The optical sheet 400 includes a diffusion sheet 410, a condensing sheet 420, and a protective sheet 430, which are sequentially stacked. The diffusion sheet 410 diffuses the light incident thereto. The condensing sheet 420 enhances brightness of the light diffused by the diffusion sheet 410. The protective sheet 430 protects the condensing sheet 420 and secures a viewing angle. In FIGS. 1 and 2, the optical sheet 400 includes three sheets, but the number of the sheets is not be limited to three.

Figure 3:
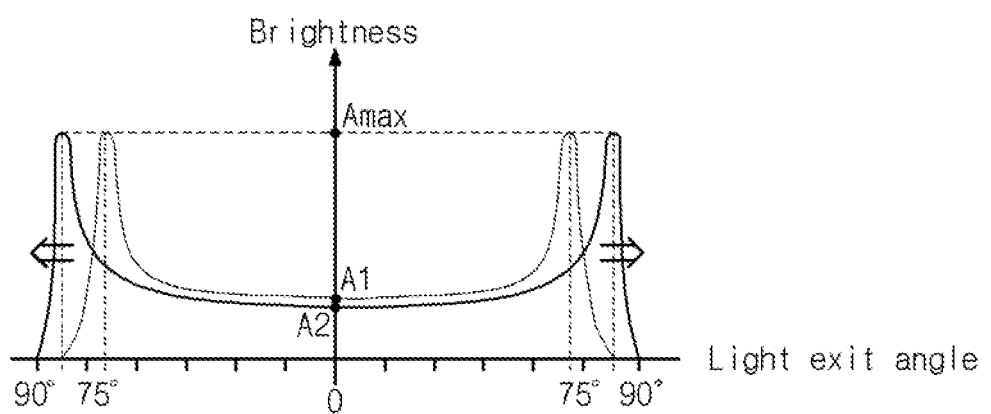
FIG. 3 is a graph showing brightness as a function of a light-emitting angle of a light-emitting unit according to an exemplary embodiment of the present disclosure.

FIG. 3 is a graph showing brightness as a function of a light emitting angle of the light emitting unit according to an exemplary embodiment of the present disclosure and that of an alternative light emitting unit.

In FIG. 3, the brightness of the alternative light-emitting unit is represented by a thin solid line and the brightness of the light-emitting unit according to an exemplary embodiment of the present invention is represented by a bold solid line.

When assuming that an angle of the light traveling in the direction of the light axis from the light source is substantially equal to zero, an angle range between two angles each having a maximum brightness Amax is referred to as a light spreading angle, i.e., a peak-to-peak (P2P) and a ratio of the brightness A1 and A2 of the light emitted at zero angle with respect to the maximum brightness Amax is referred to as a front light exit rate, i.e., a center-to-peak (C2P).

The light spreading angle and the front light exit rate may be used to test the performance of the backlight assembly. When the light-spreading angle is wide, an area covered by one light-emitting unit becomes wider and the number of the light emitting units needed is reduced. Thus, the backlight assembly may be manufactured at a lower cost. Exemplary embodiments of the present invention therefor provide for a wider light-spreading angle. The front light exit rate indicates a ratio of light emitted at a vertical angle to light emitted from the light source, and thus the front light exit rate is properly designed to provide a uniform brightness in the range of the light-spreading angle.

In case of the alternative light-emitting unit, there is a limit to which light emitted from the light source can be refracted. For example, the alternative light emitting is limited to a light-spreading angle less than about 150 degrees. In addition, the light spreading angle and the front light exit rate (A1/Amax) are not independently controlled. As a result, when the light spreading angle is designed to have a maximum range, the front light exit rate (A1/Amax) is determined to have a value separated from a reference value, and on the contrary, when the front light exit rate (A1/Amax) is designed to have the reference value, the light spreading angle is determined to have a range smaller than the maximum range.

In the case of the light-emitting unit according to the present exemplary embodiment, the light-spreading angle has the range equal to or greater than about 150 degrees and less than about 180 degrees as determined by the optical system 130 and the reflective sheet 200 having the curved portion 210. In addition, the light-spreading angle is determined by the reflection and the re-reflection of the optical system and the reflective sheet, and the front light exit rate (A2/Amax) is determined by a light transmittance of the optical system. Thus, the light-emitting unit according to the present exemplary embodiment may independently control the light spreading angle and the front light exit rate (A2/Amax).

Figure 4:
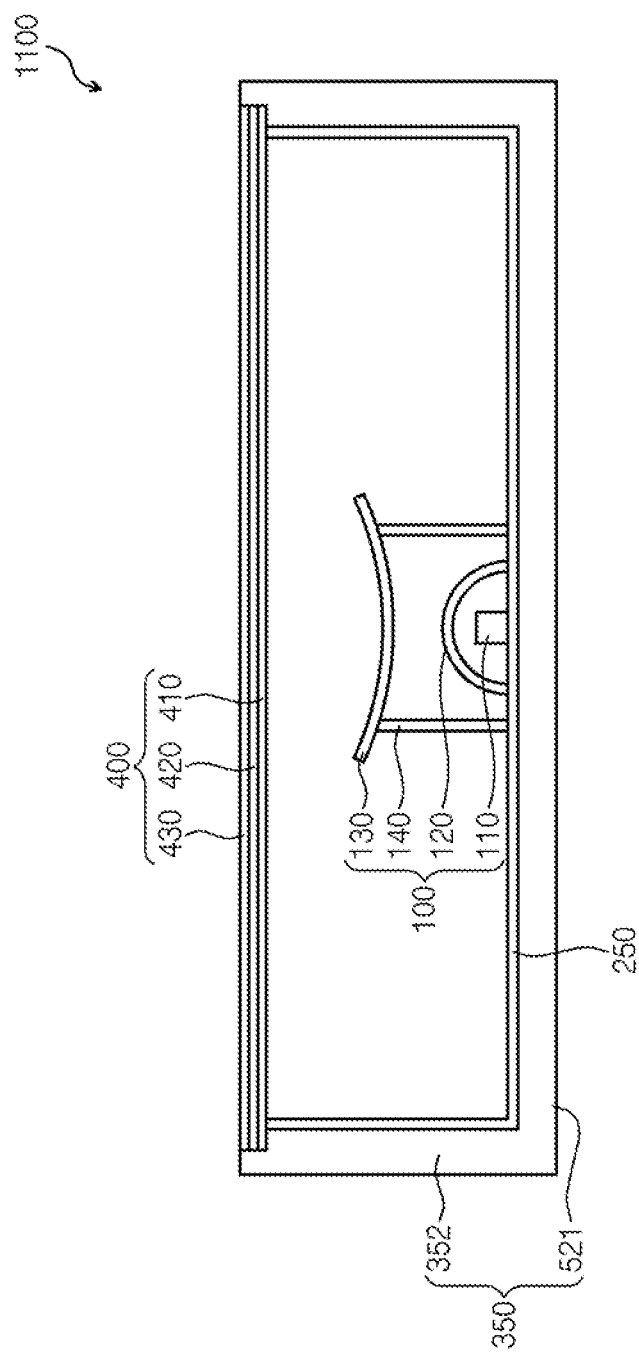
FIG. 4 is a cross-sectional view showing a backlight assembly according to an exemplary embodiment of the present disclosure.

FIG. 4 is a cross-sectional view showing a backlight assembly according to an exemplary embodiment of the present disclosure. In FIG. 4, the same reference numerals may denote the same elements in FIG. 2, and thus detailed descriptions of the same elements will be omitted.

Referring to FIG. 4, a backlight assembly 1100 includes a reflective sheet 250 and a bottom cover 350. The bottom cover 350 includes a bottom portion 351 and a sidewall 352.

The reflective sheet 250 and the bottom portion 351 are formed having a flat shape.

According to an exemplary embodiment of the present invention, although the reflective sheet 250 and the bottom portion 351 have a flat shape, the light spreading angle of the light emitted from the light source becomes wider as a result of the optical system 130 and the reflective sheet 250.

Figure 5:
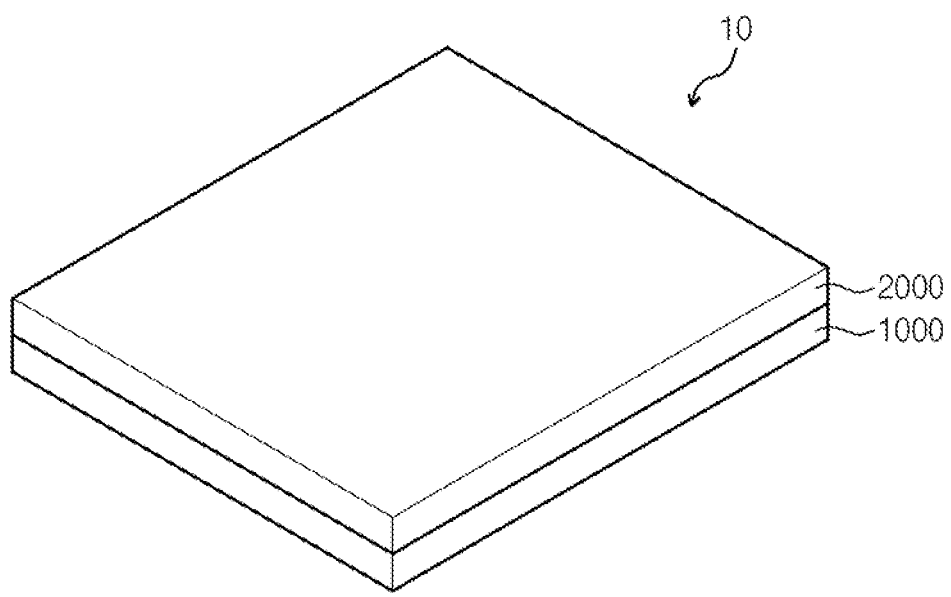
FIG. 5 is a perspective view showing a display apparatus according to an exemplary embodiment of the present disclosure.

FIG. 5 is a perspective view showing a display apparatus 10 according to an exemplary embodiment of the present disclosure.

Referring to FIG. 5, the display apparatus 10 includes the backlight assembly 1000 and a display panel 2000.

The backlight assembly 1000 provides the display panel 2000 with the light. Since the backlight assembly 1000 has been described in detail with reference to FIGS. 1 to 3, a detailed description thereof is omitted.

The display panel 2000 displays an image using the light provided from the backlight assembly 1000. The display panel 2000 may be a non-self emissive display panel such as a liquid crystal display panel, an electrophoretic display panel, an electrowetting display panel, etc.

Although exemplary embodiments of the present invention have been described herein, it is understood that the present invention should not be limited to these exemplary embodiments but various changes and modifications can be made by one ordinary skilled in the art within the spirit and scope of the present invention.

What is claimed is:

1. A light emitting unit comprising:
   a light source emitting light predominantly in a first direction;
   an optical system spaced apart from the light source with respect to the first direction, the optical system having a convex shape, with respect to the light source, the optical system reflecting a portion of the light emitted from the light source and transmitting a remaining portion of the light emitted from the light source therethrough; and
   an optical lens having a concave shape, with respect to the light source, disposed between the light source and the optical system,
   wherein the optical system is separated from the optical lens and the optical lens is separated from the light source.

2. The light emitting unit of claim 1, wherein the first direction is a vertical direction extending from the light source to the optical lens and to the optical system.

3. The light emitting unit of claim 1, wherein light emitted from the light source has a light spreading angle greater than or equal to about 150 degrees and less than or equal to about 180 degrees.

4. The light emitting unit of claim 1, wherein a light spreading angle and a front light exit rate of the light source are controlled independently from each other.

5. The light emitting unit of claim 1, wherein the optical system comprises a semi-transparent material.

6. A backlight assembly comprising:
a light emitting unit including a light source emitting light predominantly in a first direction and an optical system spaced apart from the light source with respect to the first direction, the optical system having a convex shape, with respect to the light source, the optical system reflecting a portion of the light emitted from the light source and transmitting a remaining portion of the light emitted from the light source therethrough;
an optical lens having a concave shape, with respect to the light source, disposed between the light source and the optical system;
a reflective sheet disposed under the light emitting unit to reflect the light that has been reflected by the optical system; and
a bottom cover configured to accommodate the light emitting unit and the reflective sheet,
wherein the optical system is separated from the optical lens and the optical lens is separated from the light source.

7. The backlight assembly of claim 6, wherein the first direction is a vertical direction extending from the light source to the optical lens and to the optical system.

8. The backlight assembly of claim 6, wherein one or more supporters are disposed on the reflective sheet.

9. The backlight assembly of claim 6, wherein the bottom cover comprises a bottom portion and a sidewall vertically extended from the bottom portion.

10. The backlight assembly of claim 9, wherein the reflective sheet comprises a curved portion covering the light-emitting unit when viewed in a plan view, and the curved portion has a convex shape with respect to the first direction.

11. The backlight assembly of claim 10, wherein the bottom portion has a convex shape with respect to the first direction and comprises a protruding portion supporting the curved portion.

12. The backlight assembly of claim 9, wherein the reflective sheet and the bottom portion are flat.

13. The backlight assembly of claim 6, wherein the light emitting unit has a light spreading angle greater than or equal to about 150 degrees and less than or equal to about 180 degrees.

14. The backlight assembly of claim 6, wherein a light spreading angle and a front light exit rate of the light emitting unit are controlled independently from each other.

15. The backlight assembly of claim 6, wherein the optical system comprises a semi-transparent material.

16. A display apparatus comprising:
a display panel displaying an image; and
a backlight assembly providing light to the display panel, the backlight assembly comprising:
a light emitting unit that includes a light source emitting light predominantly in a first direction and an optical system spaced apart from the light source in the first direction, the optical system having a convex shape, with respect to the light source, the optical system reflecting a portion of the light emitted from the light source and transmitting a remaining portion of the light emitted from the light source therethrough;
an optical lens having a concave shape, with respect to the light source, disposed between the light source and the optical system;
a reflective sheet disposed under the light emitting unit to reflect the light that has been reflected by the optical system; and
a bottom cover configured to accommodate the light emitting unit and the reflective sheet,
wherein the optical system is separated from the optical lens and the optical lens is separated from the light source.

17. The display apparatus of claim 16, wherein the the first direction is a vertical direction extending from the light source to the optical lens and to the optical system.

18. The display apparatus of claim 16, wherein the backlight assembly has a light spreading angle greater than or equal to about 150 degrees and less than or equal to about 180 degrees.

19. The display apparatus of claim 16, wherein a light spreading angle and a front light exit rate of the backlight assembly are controlled independently from each other.

20. The display apparatus of claim 16, wherein the optical system comprises a semi-transparent material.

21. A light emitting unit for emitting light to a display panel, comprising:
a light source module mounted on a curved bottom cover and emitting light;
an optical system having a convex shape with respect to the light source module, the optical system being disposed above the light source module; and
an optical lens having a concave shape, with respect to the light source, disposed between the light source module and the optical system,
wherein the optical system is configured to reflect a first portion of the light emitted from the light source module and to transmit a second portion of the light emitted from the light source module,
wherein the optical system is separated from the optical lens and the optical lens is separated from the light source, and
wherein the portion of light that is reflected from the optical system is then reflected by the curved bottom cover.

* * * * *